United States Patent
Wu et al.

(10) Patent No.: US 10,909,291 B2
(45) Date of Patent: Feb. 2, 2021

(54) CIRCUIT CORRECTION SYSTEM AND METHOD FOR INCREASING COVERAGE OF SCAN TEST

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Tse-Wei Wu, Hsinchu (TW); Yu-Hsun Su, Hsinchu (TW); Chen-Yuan Kao, Hsinchu (TW); Min-Hsiu Tsai, Hsinchu (TW)

(73) Assignees: GLOBAL UNICHIP CORPORATION, Hsinchu (TW); TAIWAN SEMICONDUCTOR MANUFACTURING CO., LTD, Hsinchu (TW)

( * ) Notice: Subject to any disclaimer, the term of this patent is extended or adjusted under 35 U.S.C. 154(b) by 0 days.

(21) Appl. No.: 16/702,569

(22) Filed: Dec. 4, 2019

(65) Prior Publication Data
US 2020/0380189 A1   Dec. 3, 2020

(30) Foreign Application Priority Data
May 31, 2019   (TW) .............................. 108119054 A

(51) Int. Cl.
*G06F 30/333* (2020.01)
*G01R 31/3177* (2006.01)
*G06F 30/327* (2020.01)
*G06F 30/392* (2020.01)
*G06F 119/18* (2020.01)

(52) U.S. Cl.
CPC ....... *G06F 30/333* (2020.01); *G01R 31/3177* (2013.01); *G06F 30/327* (2020.01); *G06F 30/392* (2020.01); *G06F 2119/18* (2020.01)

(58) Field of Classification Search
USPC ........................................................ 716/103
See application file for complete search history.

(56) References Cited

U.S. PATENT DOCUMENTS

| 2004/0015803 A1* | 1/2004 | Huang | .................... G06F 30/39 716/103 |
| 2006/0271899 A1* | 11/2006 | Tan | ......................... G06F 30/39 716/113 |

(Continued)

*Primary Examiner* — Mohammed Alam
(74) *Attorney, Agent, or Firm* — CKC & Partners Co., LLC

(57) ABSTRACT

A method for increasing coverage of a scan test, executed by at least one processor, includes following operations: analyzing a first netlist file and a second netlist file to acquire a change of a circuit structure, in which the first netlist file corresponds to a first scan chain circuitry, and the second netlist file corresponds to a second scan circuitry wherein the second netlist file is generated by processing the first netlist file with executing an engineering change order (ECO); repairing the second scan chain circuitry according to at least one predetermined criterion; evaluating a candidate node of the repaired second scan chain circuitry, to connect a new flip flop circuit generated after executing the ECO to the candidate node; and storing the second netlist file being processed as a third netlist file, to fabricate an integrated circuit.

16 Claims, 8 Drawing Sheets

(56) References Cited

U.S. PATENT DOCUMENTS

2009/0172615 A1\* 7/2009 Ortiz .............. G01R 31/318575
716/106
2017/0323030 A1\* 11/2017 Datta ...................... G06F 30/34
2020/0004913 A1\* 1/2020 Goel ..................... G06F 30/394

\* cited by examiner

CIRCUIT CORRECTION SYSTEM AND METHOD FOR INCREASING COVERAGE OF SCAN TEST

CROSS-REFERENCE TO RELATED APPLICATION

This application claims priority to Taiwan Application Serial Number 108119054, filed May 31, 2019, which is herein incorporated by reference.

TECHNICAL FIELD

The present disclosure relates to a circuit correction system, and in particular, relates to a circuit correction system that is applied for engineering change orders and increase of coverage of a scan test.

BACKGROUND

Engineering change orders (ECO) are used to change components, functions, workflows, or engineering specifications. In integrated circuit design applications, ECO is often used to correct design errors found during design, or to make changes to design specifications to compensate for other system requirements. However, with the circuit processed with ECO, it may cause that subsequent processes would require some unexpected extra time, such as the decrease of coverage of the scan test or the burden of re-layout and re-routing, etc., resulting in the longer development cycle of the integrated circuits.

SUMMARY

In order to solve the above problems, an aspect of the present disclosure provides a method for increasing coverage of a scan test, executed by at least one processor, and the method includes the following operations: analyzing a first netlist file and a second netlist file to acquire a change of a circuit structure, wherein the first netlist file corresponds to a first scan chain circuitry, and the second netlist file corresponds to a second scan circuitry wherein the second netlist file is generated by processing the first netlist file with executing an engineering change order (ECO); repairing the second scan chain circuitry according to at least one predetermined criterion; evaluating a candidate node of the repaired second scan chain circuitry, to connect a new flip flop circuit generated after executing the ECO, to the candidate node; and storing the second netlist file being processed as a third netlist file, to fabricate an integrated circuit.

An aspect of the present disclosure provides a circuit correction system including a memory and a processor. The memory is configured to store at least one program code. The processor is configured to execute the at least one program code, to perform the following operations: analyzing a first netlist file and a second netlist file to acquire a change of a circuit structure, wherein the first netlist file corresponds to a first scan chain circuitry, and the second netlist file corresponds to a second scan circuitry wherein the second netlist file is generated by processing the first netlist file with executing an engineering change order (ECO); repairing the second scan chain circuitry according to at least one predetermined criterion; evaluating a candidate node of the repaired second scan chain circuitry, to connect a new flip flop circuit generated after executing the ECO to the candidate node; and storing the second netlist file being processed as a third netlist file, to fabricate an integrated circuit.

In some embodiments, the operation of analyzing the first netlist file and the second netlist file to acquire the change of the circuit structure includes: mapping the first scan chain circuitry and the second scan chain circuitry, and classifying a change of scan chain circuit structure.

In some embodiments, the operations of mapping the first scan chain circuitry and the second scan chain circuitry and classifying the change of scan chain circuit structure includes: sequentially classifying unmapped flip flop circuits in the first scan chain circuitry and the second scan chain circuitry according to a flip-flop type and an input and output pin type, to determine whether the second scan chain circuitry meets the at least one predetermined criterion.

In some embodiments, the at least one predetermined criterion includes a disconnection of the unmapped flip flop circuits and other circuits of the second scan chain circuitry, a change of an order of connections between the unmapped flip flop circuits and other flip flop circuits of the second scan chain circuitry, or any combination thereof.

In some embodiments, the operation of repairing the second scan chain circuitry according to the at least one predetermined criterion includes: reconnecting the unmapped flip flop circuits to other circuits of the second scan chain circuitry or recovering the order of connections between the unmapped flip flop circuits and other flip flop circuits of the second scan chain circuitry to repair the second scan chain circuitry.

In some embodiments, the operation of evaluating the candidate node of the repaired second scan chain circuitry, to connect the new flip flop circuit generated by executing the ECO to the candidate node includes: recognizing the new flip flop circuit according to the second netlist file; and classifying a plurality of existing flip flop circuits and the new flip flop circuit in the second scan chain circuitry according to a clock domain and a triggering edge to find the at least one candidate node.

In some embodiments, the new flip flop circuit is classified into a first classification, and the operation of finding the at least one candidate node includes: evaluating at least one existing flip flop circuit of the existing flip flop circuits, which belongs to the first classification, according to at least one of a circuit level, a functional relevance, or a number of fanouts, to find the at least one candidate node.

In some embodiments, the operation of evaluating at least one existing flip flop circuit of the existing flip flop circuits, which belongs to the first classification, includes: ranking the at least one existing flip flop circuit according to the circuit level and the functional relevance; and selecting an output end of a flip flop circuit with a highest ranking and a lowest number of fanouts, in the at least one existing flip flop circuit, as the at least one candidate node.

In summary, the circuit correction system and the method for increasing coverage of a scan test provided in the embodiment of the present disclosure may efficiently check the scan chain circuitry processed by the ECO, to improve the coverage of the scan test and shorten the subsequent process time.

BRIEF DESCRIPTION OF THE DRAWINGS

The drawings in the present disclosure is described as follows.

DETAILED DESCRIPTION

Figure 1:
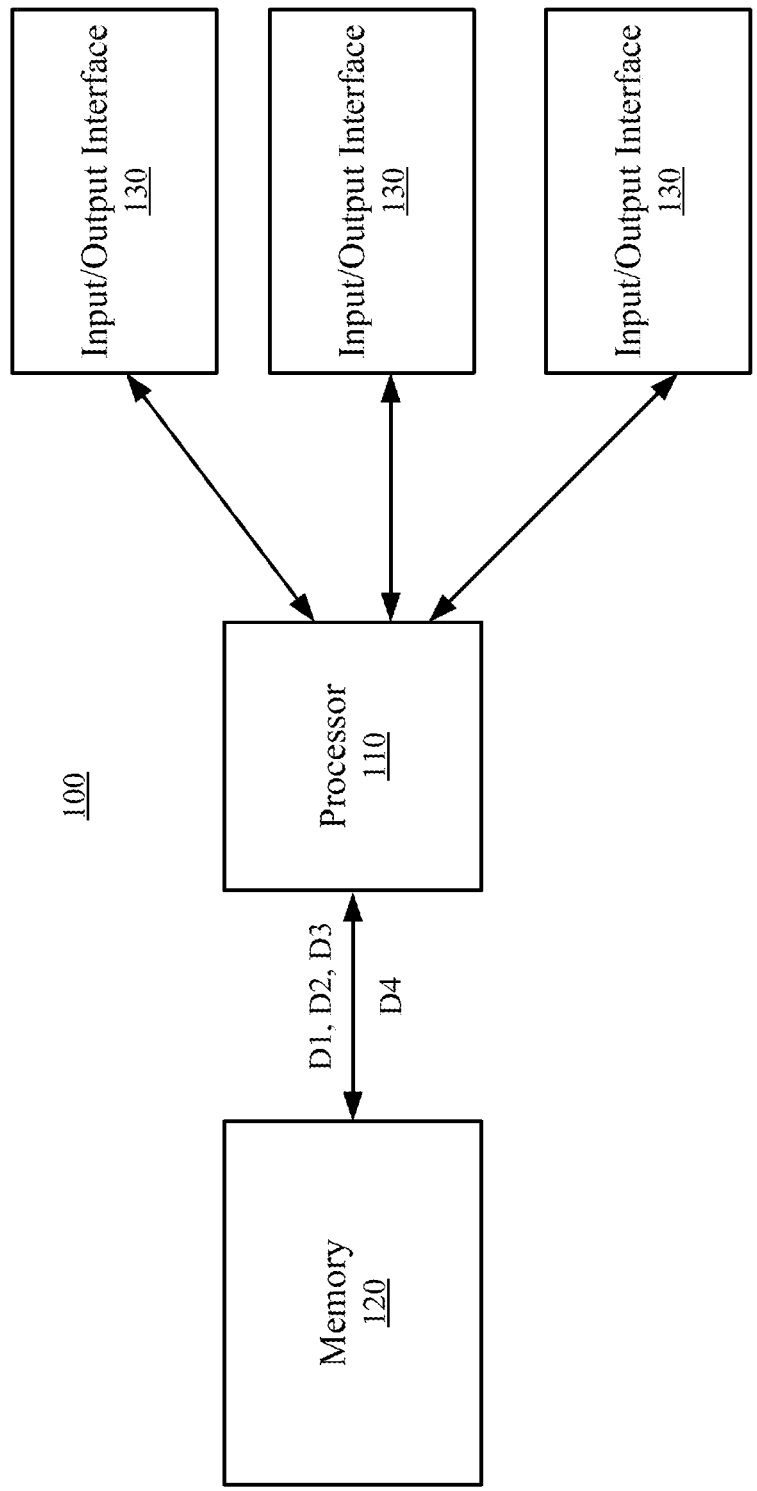
FIG. 1 is a schematic diagram of the circuit correction system depicted according to some embodiments of the present disclosure.

The following embodiments are disclosed with accompanying figures for detailed description. Given for illustrative purposes clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

As used herein, "coupled" and "connected" may be used to indicate that two or more elements physical or electrical contact with each other directly or indirectly, and may also be used to indicate that two or more elements cooperate or interact with each other.

As used herein, "about", "substantially" or "equivalent" shall generally mean within 20 percent, preferably within 10 percent, and more preferably within 5 percent of a given value or range. Numerical quantities given herein are approximate, meaning that the term "about", "substantially" or "equivalent" can be inferred if not expressly stated. As used herein, the term "and/or" includes any and all combinations of one or more of the associated listed items.

In this disclosure, the term "circuitry" may indicate a single system formed with one or more circuits. The term "circuit" may indicate an object, which is formed with one or more transistors and/or one or more active/passive elements based on a specific arrangement, for processing signals.

For ease of understanding, similar components in the figures of the present disclosure will be designated with the same reference numerals.

Referring to FIG. 1, FIG. 1 is a schematic diagram of a circuit correction system 100 depicted according to some embodiments of the present disclosure. In some embodiments, the circuit correction system 100 may be applied to engineering change orders (ECO) associated with the integrated circuit design, to reduce the time required for the circuit design and/or the testing stage.

The circuit correction system 100 includes a processor 110, a memory 120, and one or more input/output (I/O) interfaces 130. The processor 110 is coupled to the memory 120 and the I/O interfaces 130.

In various embodiments, the processor 110 is implemented by one or more central processing units (CPUs), application-specific integrated circuits (ASICs), multi-processors, distributed processing systems, or suitable processing units. Various circuits or units suitable for implementing the processor 110 are within the contemplated scope of the present disclosure.

The memory 120 stores one or more program codes for assisting in designing the integrated circuit. For example, the memory 120 stores one or more program codes, and these program codes are encoded by at least one set of instructions, in which the set of instructions is used to perform a scan test and/or the method 300 of FIG. 3 described below for the chip or the integrated circuit. The processor 110 may execute the program codes stored in the memory 120, and the above-described operations (such as FIG. 3 described below) may be performed automatically.

In some embodiments, the memory 120 is implemented by a non-transitory computer readable storage medium that stores multiple sets of instructions for executing ECO associated with a scan test. For example, the memory 120 stores multiple executable instructions configured to perform, for example, operations including multiple operations of FIG. 3. In some embodiments, the computer readable storage medium is implemented by an electrical, magnetic, optical, infrared, and/or semiconductor system (or apparatus or device). For example, the computer readable storage medium includes semiconductor or solid state memory, a magnetic tape, a removable computer disk, random access memory (RAM), read only memory (ROM), a hard disk, and/or an optical magnetic disk. In one or more embodiments using an optical disk, the computer readable storage medium includes compact disc read-only memory (CD-ROM), a compact disc rewritable (CD-R/W), and/or a digital video disc (DVD).

Multiple I/O interfaces 130 receive multiple inputs or commands from various control devices, in which the control devices may be manipulated by the circuit designer. Accordingly, the circuit correction system 100 may be manipulated by the inputs or commands transmitted through the multiple I/O interfaces 130. For example, the circuit designer may input data carrying a netlist file corresponding to an integrated circuit via the multiple I/O interfaces 130, for the processor 110 to perform analysis.

In some embodiments, the multiple I/O interfaces 130 include a screen configured to display the status of executing program codes. In some embodiments, the multiple I/O interfaces 130 include a graphical user interface (GUI). In some other embodiments, the multiple I/O interfaces 130 include a keyboard, a numeric keypad, a mouse, a trackball, a touch screen, a cursor movement key, or a combination thereof, to communicate information and multiple commands with the processor 110.

To explain the method 300 of FIG. 3 described below, various related terms or elements will be described with reference to FIG. 2.

Figure 2:
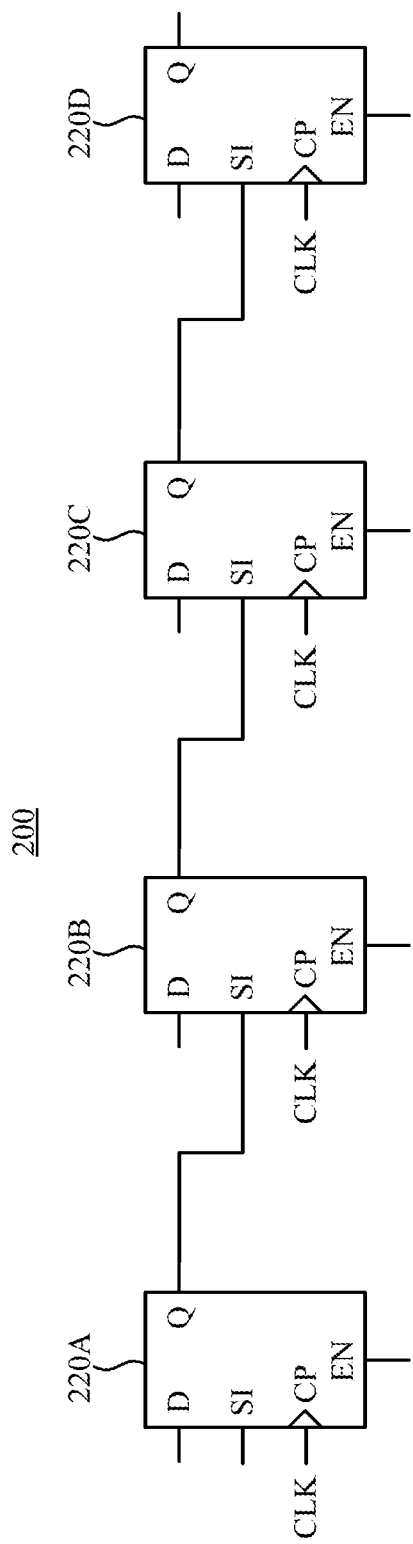
FIG. 2 is a schematic diagram of the scan chain circuitry depicted according to some embodiments of the present disclosure.

Referring to FIG. 2, FIG. 2 is a schematic diagram of a scan chain circuitry 200 depicted according to some embodiments of the present disclosure. In some embodiments, the scan chain circuitry 200 may be implemented in an integrated circuit (or a chip) for subsequent testing (for example, timing analysis, and the like).

The scan chain circuitry 200 includes serially connected flip flop circuits 220A-220D. In some embodiments, the flip flop circuits 220A-220D may be implemented by scan flip flops, but the present disclosure is not limited thereto. Various types of flip flop circuits 220A-220D are within the contemplated scope of the present disclosure.

Each one of the flip flop circuits 220A-220D includes a clock receiving terminal CP, a first input terminal SI, a second input terminal D, an enabling terminal EN, and an output terminal Q, in which the enabling terminal EN is configured to receive a scan enable signal (not shown), and the clock receiving terminal CP is configured to receive a clock signal CLK. The first input terminal SI of the flip flop circuit 220A is configured to receive a scan input signal (not shown), and the output terminal Q of the flip flop circuit 220A is coupled to the first input terminal SI of the flip flop circuit 220B. Reduced by analogy, the output terminal Q of the flip flop circuit 220D is configured to output a scan output signal (not shown).

The second input terminal D of each one of the flip flop circuits 220A-220D is coupled to a corresponding input/output node in a circuit under test (not shown), to receive/output a primary input/output signal (not shown), respectively. Upon receiving the scan enable signal with a particular logic value, the flip flop circuits 220A-220D are enabled to enter a scan mode. In the scan mode, the operations of the flip flop circuits 220A-220D are similar to shift registers, and the flip flop circuits 220A-220D generate a scan output signal (not shown) according to the scan input signal (not shown). Equivalently, when operating in the scan mode, each one of the flip flop circuits 220A-220D latches the signal received by its first input terminal SI, and outputs the signal via the output terminal Q. In other words, in the scan mode, the scan output signal is determined by the scan input signal, and is not affected by the circuit under test. Accordingly, in the subsequent testing operation after the scan mode, whether the circuit under test is faulty can be determined by detecting a change in the signal value of the scan output signal. In some embodiments, the circuit under test may be implemented by a collection of one or more digital (or logic) circuits, but the present disclosure is not limited thereto.

In some embodiments, the circuit structure and circuit connection of the scan chain circuitry 200 may be defined by a netlist file. For example, as shown in FIG. 1, the I/O interface 130 may receive data D1 and store the data D1 in the memory 120, in which the data D1 is used to describe the netlist file of the internal circuit of the scan chain circuitry 200. In some embodiments, the content of the netlist file meets a predetermined type of the syntax that is recorded in a description format that is able to be recognized by the circuit correction system 100. In some embodiments, the netlist file is a gate-level netlist file. In some embodiments, the predetermined type of the netlist file may be a hardware description language (Verilog) or a very high-speed hardware description language (VHDL). The types of the above syntax are given for illustrative purposes, and the present disclosure is not limited thereto.

In some embodiments, the circuit structure (for example, the circuit elements and/or connections) of the scan chain circuitry 200 may be changed after performing ECO. For example, the flip flop circuit is removed, the order of the connection is changed, a new flip flop circuit is added, or the like. In some cases, these changes may cause the malfunction of the scan chain circuitry 200, a decrease of the coverage of the test, or an additional burden on subsequent layout and routing. In some embodiments, the circuit correction system 100 may perform the method 300 described below to address the above problems.

Figure 3:
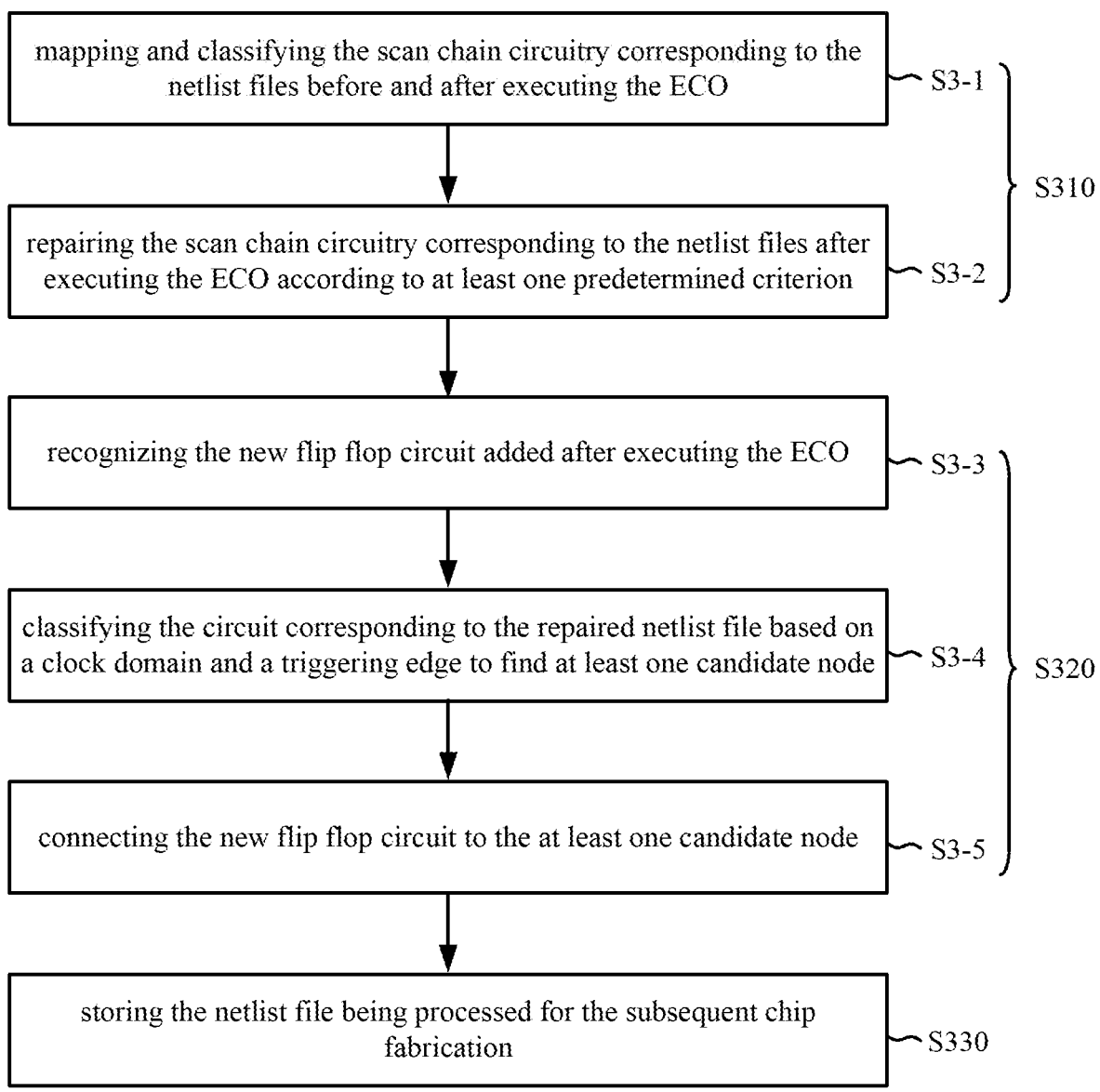
FIG. 3 is a flowchart of the method for increasing coverage of a scan test depicted according to some embodiments of the present disclosure.

Referring to FIG. 3, FIG. 3 is a flowchart of the method 300 for increasing a rate of a scan test depicted according to some embodiments of the present disclosure. In some embodiments, the method 300 may be performed by the processor 110 of FIG. 1.

In the operation S310, the netlist files before and after executing the ECO are analyzed. The operation S310 includes sub-operations S3-1 and S3-2.

In the sub-operation S3-1, the scan chain circuitry corresponding to the netlist files before and after executing the ECO are mapped and classified.

In the sub-operation S3-2, the scan chain circuitry corresponding to the netlist files after executing the ECO is repaired according to at least one predetermined criterion.

Figure 4A:
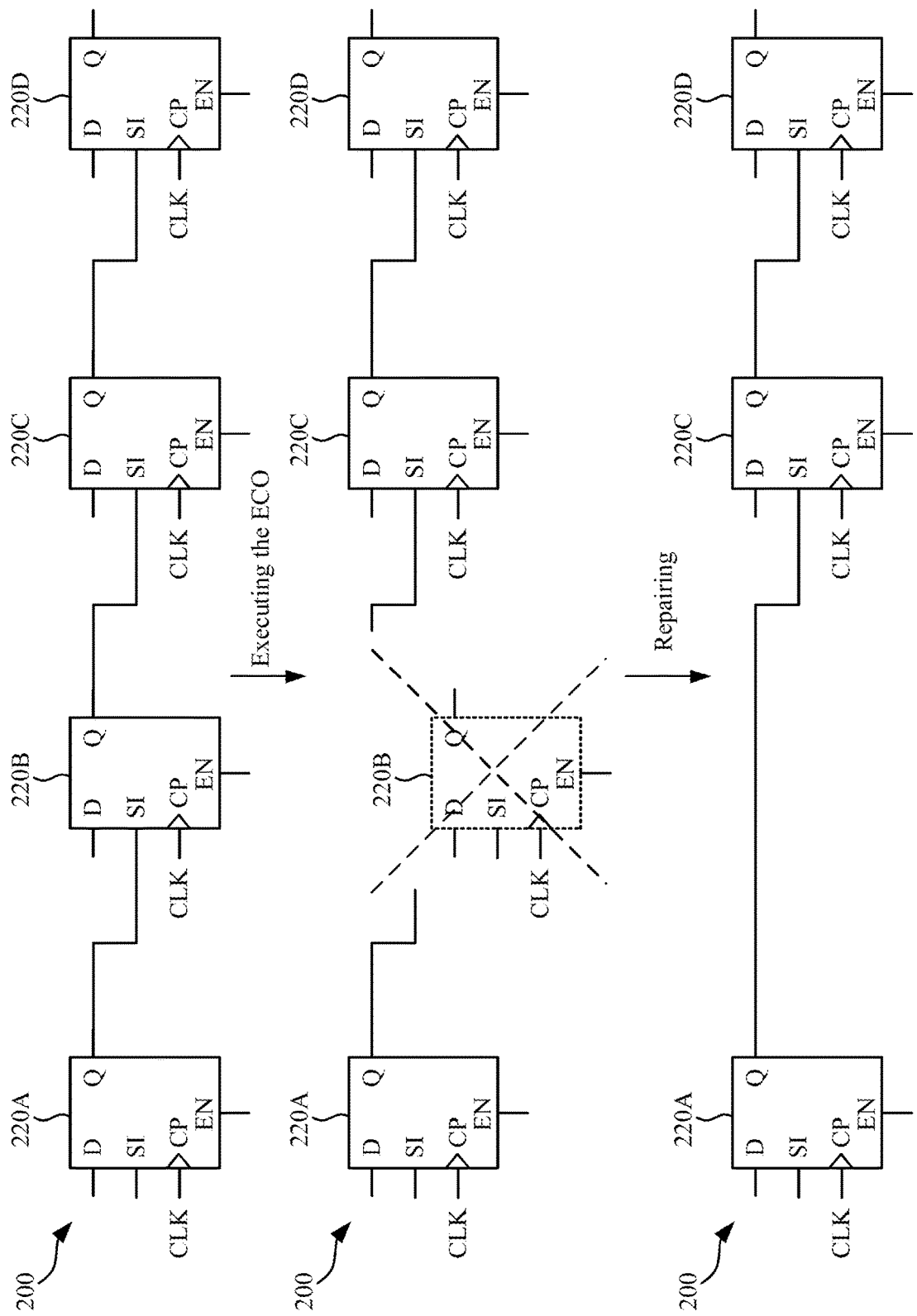
FIG. 4A is a schematic concept diagram of the operations of mapping and classifying the connection in FIG. 3 depicted according to some embodiments of the present disclosure.
Figure 4B:
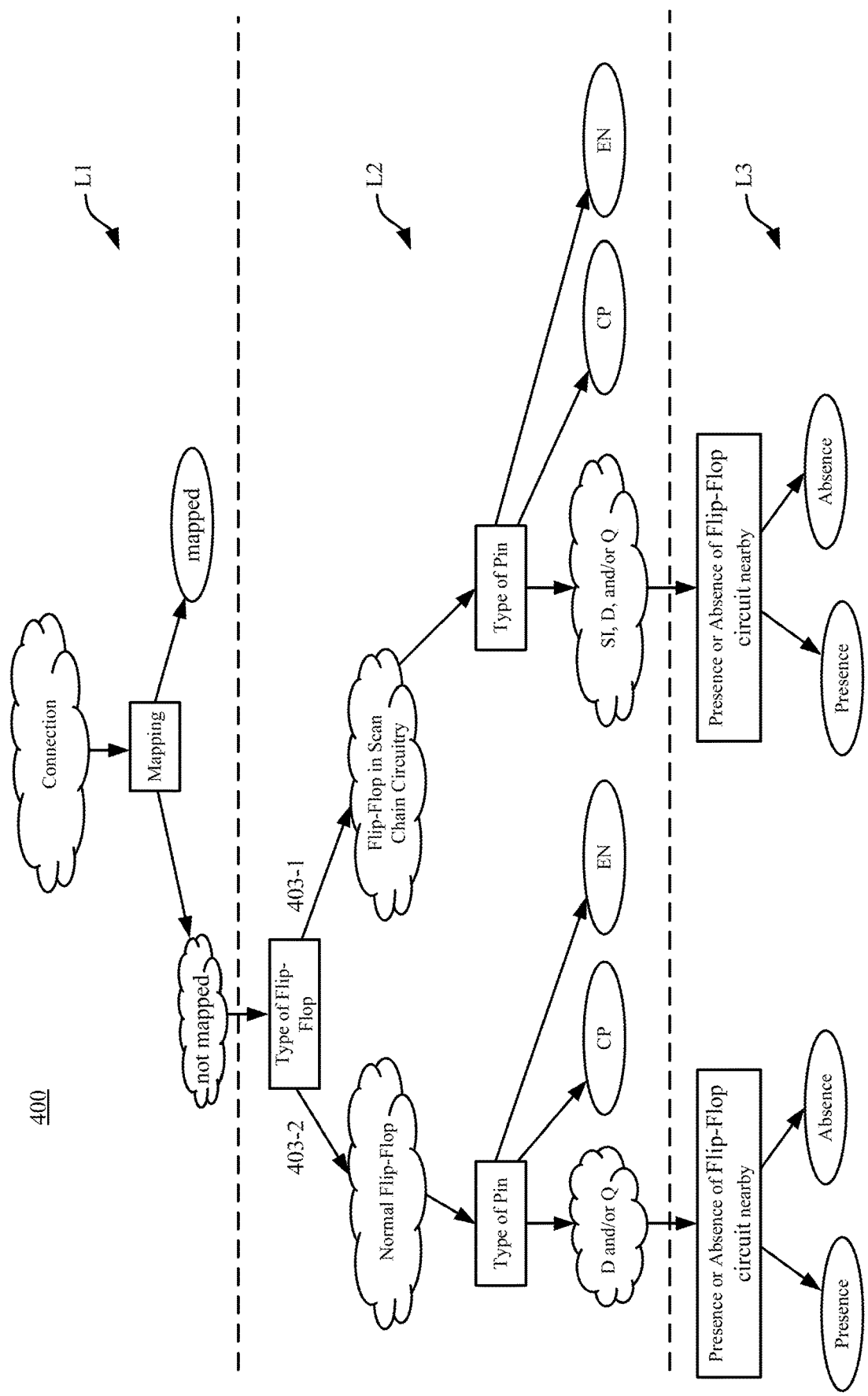
FIG. 4B is a classification tree diagram depicted according to some embodiments of the present disclosure.

For ease of understanding, reference is made to FIGS. 4A and 4B. FIG. 4A is a schematic concept diagram of the operations (i.e., the operation S310) of mapping and classifying the connection in FIG. 3 depicted according to some embodiments of the present disclosure, and FIG. 4B is a classification tree diagram 400 depicted according to some embodiments of the present disclosure.

In some cases, after executing the ECO, the circuit structure (for example, the connection) in the scan chain circuitry 200 may vary. In some embodiments, the processor 110 stores the netlist file, corresponding to the scan chain circuitry 200, after executing the ECO, as data D2 (as shown in FIG. 1), and stores the data D2 in the memory 120. By comparing the data D1 with the data D2, the processor 110 may acquire the difference between the circuit structures of the scan chain circuitry 200 before and after executing the ECO.

As shown in FIG. 4A, in this example, after executing the ECO, the existing flip flop circuit 220B is removed, resulting in a disconnection of the existing flip flop circuit 220A and other circuits. By comparing the data D1 with the data D2, the processor 110 may acquire the information of the change of the above connection. For example, the processor 110 may classify and map the data D1 and D2 according to the tree diagram 400 of FIG. 4B. As shown in FIG. 4B, at the first layer L1, the processor 110 maps the data D1 and the data D2 to obtain the aforementioned change of the connection. If any relevant element is mapped, this means that the connection of the circuit element does not change, such as the connection of the flip flop circuits 220C and 220D of FIG. 4. If no relevant element is mapped, the connection of the circuit element changes, such as the connection of the flip flop circuits 220A and 220B of FIG. 4.

Next, at the second layer L2, the processor 110 classifies the unmapped elements. In the example of the type of the flip flop circuit, if the unmapped element is a flip flop circuit (i.e., the aforementioned scan flip-flop) in the scan chain circuitry 200, this element may be classified into the branch 403-1. Conversely, if the unmapped element is a normal flip flop circuit, this element may be classified into the branch 403-2.

The classifying ways of the branch 403-1 and the branch 403-2 are the same, and the branch 403-1 is discussed below for example. According to the data D2, the processor 110 confirms that the flip flop circuit 220A (and/or the flip flop circuit 220B) is a flip flop circuit in the scan chain circuitry 200. The processor 110 performs the classifying operation according to the input and output pins (for example, including the clock receiving terminal CLK, the data input/output terminal (for example, the first input terminal SI, the second input terminal D, the output terminal Q, and the like), and the enabling terminal EN of FIG. 1) of the flip flop circuit 220A (and/or the flip flop circuit 220B). The above implementation is only given for illustrative purposes, and the present disclosure is not limited thereto. In other embodiments, the pins of the flip flop circuit may further include a reset terminal and the like.

At the third layer L3, the processor 110 further searches and determines whether there is any other flip flop circuit in the vicinity of the present classified flip flop circuit. For example, after classifying the flip flop circuit 220A, the processor 110 is further informed, according to the data D2, of the presence of the existing flip flop circuits 220C and 220D in the vicinity of the flip flop circuit 220A.

After performing the above operations, the processor 110 may confirm whether the scan chain circuitry 200 after executing the ECO meets the at least one predetermined criterion. Depending on the different applications, the at least one predetermined criterion may be set to increase the coverage of the scan test, and/or to avoid automatic layout and routing again, and the like, to increase the efficiency and reliability of the circuit testing. In this example, the disconnection of the flip flop circuit 220A and other circuits may result in the decrease of test coverage for scan chain circuitry 200. Accordingly, the processor 110 determines that the scan chain circuitry 200 after executing the ECO meets the predetermined criterion, to repair the scan chain circuitry 200. As shown in FIG. 4A, the processor 110 reconnects the output terminal Q of the flip flop circuit 220A to the first input terminal SI of the existing flip flop circuit 220C. As such, the coverage of the testing of the repaired scan chain circuitry 200 can be increased.

Figure 5:
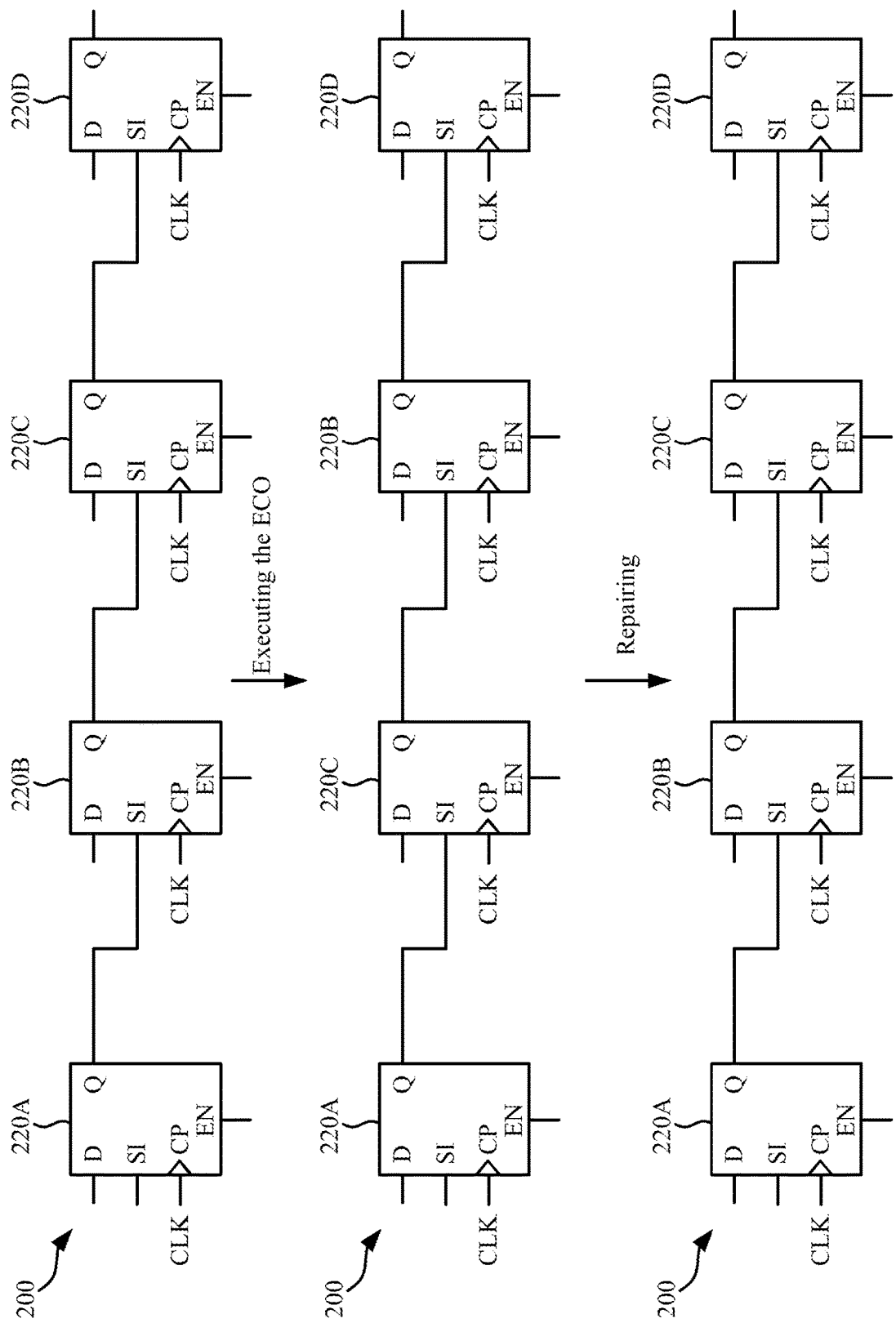
FIG. 5 is a schematic concept diagram of the operations of mapping and classifying the connection in FIG. 3 depicted according to some embodiments of the present disclosure.

Referring to FIG. 5, FIG. 5 is a schematic concept diagram of the operations (i.e., the operation S310) of mapping and classifying the connection in FIG. 3 depicted according to some embodiments of the present disclosure. Compared with FIG. 4A, in this example, after executing the ECO, the order of the connection of the flip flop circuit 220B and the flip flop circuit 220C is changed. In this criterion, the re-routing and re-layout operation will be required in the subsequent procedure, resulting in an additional burden. Accordingly, the processor 110 determines that the scan chain circuitry 200 after executing the ECO meets the predetermined criterion, to repair the scan chain circuitry 200. As shown in FIG. 5, the processor 110 resets the order of the connection of the flip flop circuit 220B and the flip flop circuit 220C. As such, the additional burden of routing can be avoided.

Still referring to FIG. 3, in the operation S320, at least one candidate node in the repaired netlist file is evaluated, to connect a new circuit added after the executing ECO to the at least one candidate node. The operation S320 includes sub-operations S3-3, S3-4, and S3-5.

In the sub-operation S3-3, the new flip flop circuit added after executing the ECO is recognized.

In the sub-operation S3-4, the circuit corresponding to the repaired netlist file is classified based on a clock domain and a triggering edge, to find at least one candidate node.

In the sub-operation S3-5, the new flip flop circuit is connected to the at least one candidate node.

In some embodiments, compared with the operation S310, the operation S320 is performed to process the new flip flop circuit added into the scan chain circuitry 200 after executing the ECO.

Figure 6A:
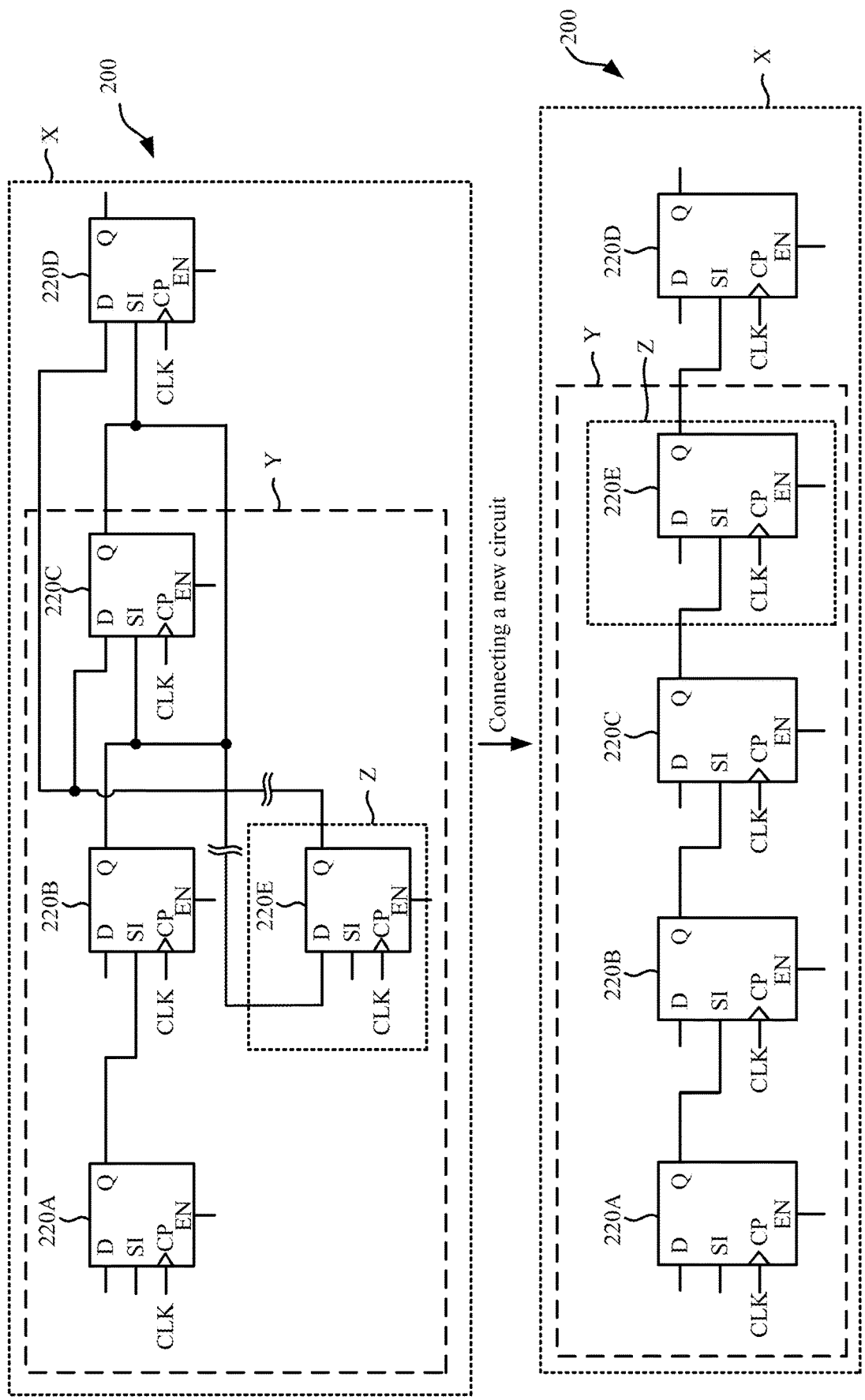
FIG. 6A is a schematic concept diagram of evaluating at least one candidate node of the repaired netlist file in FIG. 3 depicted according to some embodiments of the present disclosure.
Figure 6B:
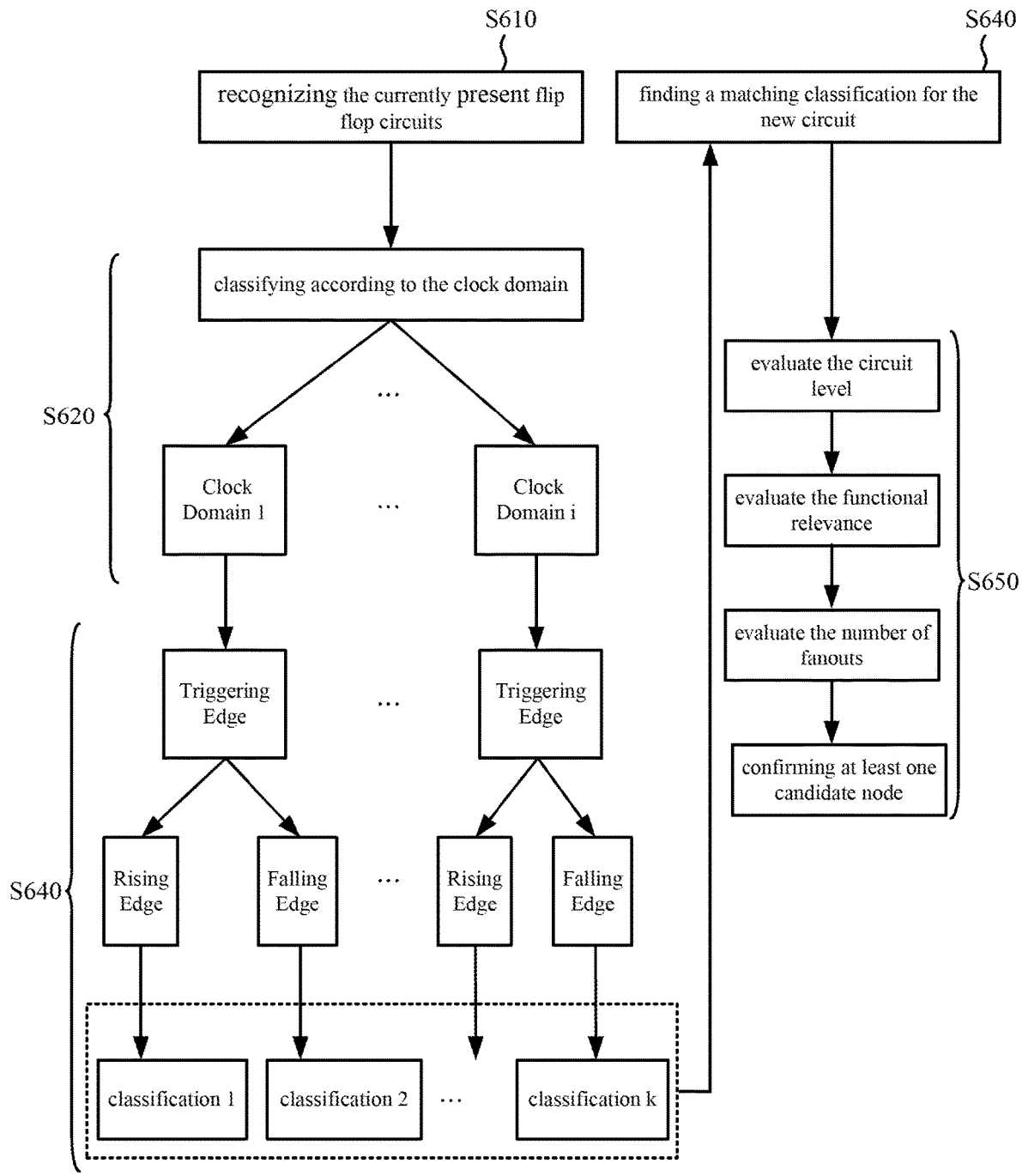
FIG. 6B is a classifying flowchart depicted according to some embodiments of the present disclosure.

For ease of understanding, reference is made to FIGS. 6A and 6B. FIG. 6A is a schematic concept diagram of evaluating at least one candidate node of the repaired netlist file in FIG. 3 (i.e., the operation S320) depicted according to some embodiments of the present disclosure, and FIG. 6B is a classifying flowchart 600 depicted according to some embodiments of the present disclosure.

In this example, the repaired scan chain circuitry 200 includes the existing flip flop circuits 220A-220D, and after executing the ECO, the scan chain circuitry 200 further includes a new flip flop circuit 220E. In some embodiments, by comparing the aforementioned data D1 with the data D2, the processor 110 may recognize that the flip flop circuit 220E is a new circuit added after executing the ECO. In the circuit hierarchy, the flip flop circuits 220A-220C and the sub-module Z in the lower level belong to the same sub-module Y, the flip flop circuit 220E belongs to the sub-module Z, and the flip flop circuit 220D belongs to the module X in the uppermost level. In some embodiments, after the operation S310 is performed, the processor 110 may store the repaired netlist file as data D3, to analyze the data D3 to perform the sub-operations S3-4 and S3-5.

As shown in FIG. 6B, the processor 110 analyzes the data D3 to recognize the currently present flip flop circuits 220A-220E (i.e., the operation S610). The processor 110 classifies the flip flop circuits 220A-220E according to the clock domain corresponding to the clock signal (i.e., the signal received by the clock receiving terminal CP) received by each one of the flip flop circuits 220A-220E, i.e., the operation S620. In some embodiments, when clock signal sources connected to multiple clock signal inputs are the same and there is a fixed phase correlation between the clock signals, the clock signals may be considered as in the same clock domain. Conversely, when clock signal sources connected to multiple clock signal inputs are different, or there is no fixed phase correlation between the clock signals, the clock signals may be considered as in different clock domains.

Next, the processor 110 analyzes the data D3 to confirm that each one of the flip flop circuits 220A-220E is triggered by the rising edge or the falling edge of the clock signal, to further classify the flip flop circuits 220A-220E, i.e., the operation S630. As such, the processor 110 may find a matching classification for the newly added flip flop circuit 220E, i.e., the operation S640, and evaluate the circuit level, the functional relevance, and the number of fanouts of other flip flop circuits in the matching classification, to confirm at least one candidate node, i.e., the operation S650.

For example, the processor 110 analyzes that the flip flop circuit 220E belongs to the classification 1, and the flip flop circuits 220A-220D also belong to the classification 1. Next, the processor 110 considers the circuit level and the functional relevance between the flip flop circuit 220E and each one of the flip flop circuits 220A-220D for ranking (as shown in the following table).

| Flip Flop Circuits | Circuit Level | Functional Relevance | Total Score | Number of Fanouts |
| --- | --- | --- | --- | --- |
| 220A | 20 | 0 | 20 | Not calculated |
| 220B | 20 | 6 | 26 | 8 |
| 220C | 20 | 6 | 26 | 3 |
| 220D | 10 | 2 | 12 | Not calculated |

In some embodiments, the processor 110 may select the output of the flip flop circuit with the highest score on the circuit level and/or the functional relevance and the lowest number of fanouts as the candidate node. For example, as described above, the flip flop circuits 220A-220C and the flip flop circuit 220E belong to the sub-module Y, and thus the scores on the circuit level of the flip flop circuits 220A-220C are higher. In contrast, since the flip flop circuit 220D and the flip flop circuit 220E belong to different sub-modules, the score of the circuit level of the flip flop circuit 220D is lower. In some embodiments, the circuits belonging to the same circuit level typically have similar positional relationships and/or related functional relationships, thereby reducing the burden of subsequent routing. Therefore, if circuit levels of a circuit and the new flip flop circuit 220E are closer, the score will be higher (for example, 20 points). Conversely, if circuit levels of a circuit and the new flip flop circuit 220E are farther, the score will be lower (for example, 10 points).

In some embodiments, the relationship of the circuit levels may be defined by the description of the netlist file (for example, using ".subckt" or the like), and thus the processor 110 may be informed of the aforementioned circuit levels by analyzing the netlist file corresponding to the data D3.

Further, as shown in FIG. 6A, the input or output of the flip flop circuit 220E may affect the inputs or outputs of the flip flop circuits 220B and 220C directly, and may not have direct relationship with the other flip flop circuits 220A and 220D. Therefore, the score of the functional relevance of the flip flop circuits 220B and 220C is higher than the score of the functional relevance of the flip flop circuits 220A and 220D. As shown in the above table, the scores of the flip flop circuit 220B and the flip flop circuit 220C both are 26.

The processor 110 further analyzes the data D3 to acquire the number of fanouts of the flip flop circuit 220B and the number of fanouts of the flip flop circuit 220C. The number of fanouts represents the number of logic gates connected to (or driven by) the output of the flip flop circuit. When the number of fanouts is lower, it means that the flip flop circuit still has remaining load capacity of being connected to other logic gates. For example, as shown in the above table, the number of fanouts of the flip flop circuit 220B is 8, and the number of fanouts of the flip flop circuit 220C is 3.

Therefore, as shown in FIG. 6A, the processor 110 selects the output of the flip flop circuit 220C as a candidate node, and connects the new flip flop circuit 220E to the output of the flip flop circuit 220C, and is serially connected to the flip flop circuit 220D. As a result, the testing result of the flip flop circuit 220E and its circuit under test can be considered to improve the coverage of the test of the scan chain circuitry 200.

Still referring to FIG. 3, in the operation S330, the processed netlist file is stored for the subsequent chip fabrication. For example, the processor 110 may store the netlist file corresponding to the processed scan chain circuitry 200 of FIG. 6A, as data D4 of FIG. 1. In the subsequent process, the data D4 may be used to implement additional (unnecessary) layout and/or routing procedures, to fabricate related chips or integrated circuits.

In some related techniques, in the circuit testing, the scan chain circuitry after executing the ECO usually requires re-execution of the verification of the design for test (DFT), and re-execution of the complete layout and routing procedures, in order to ensure that the scan chain circuitry after executing the ECO has the sufficient test coverage. In the related techniques, the above verification and/or re-layout requires manpower of test engineers and layout engineers with sufficient experience as well as additional test time. With respect to the above techniques, in the embodiments of the present disclosure, by performing the method 300, the scanning circuitry after executing ECO can be checked step by step systematically, to efficiently repair the scan chain circuitry while mitigating the additional burden of routing.

In some non-limiting experimental examples, compared with the related techniques described above, the circuit correction system 100 and method 300 of the embodiments of the present disclosure may save about 62%-88% of the time of the ECO procedure.

The various operations of the method 300 described above are only given for illustrative purposes, and are not limited to being performed in the order of this example. Various operations for the method 300 may be appropriately added, substituted, omitted, or performed in a different order, without departing from the scope of the various embodiments of the present disclosure.

The scan chain circuitry 200 and the related connection after executing the ECO described above are given for illustrative purposes, but the present disclosure is not limited thereto. The method 300 of the present disclosure is applicable to various types of ECO applications.

In some embodiments, the method 300 may be implemented as a design tool carried in the non-transitory computer readable medium. In other words, the method 300 may be implemented by a hardware, a software, a firmware, or any combinations thereof. For example, if the speed and accuracy are the primary considerations, the method 300 may be implemented primarily by a hardware and/or a firmware. Alternatively, if the design flexibility is the primary considerations, the method 300 may be implemented primarily by a software. The above implementation is only given for illustrative purposes, and the present disclosure is not limited thereto.

In summary, the circuit correction system and the method for increasing coverage of a scan test provided in the embodiment of the present disclosure may efficiently check the scan chain circuitry processed by the ECO, to improve the coverage of the scan test and shorten the subsequent process time.

Although the present disclosure has been described in considerable detail with reference to certain embodiments thereof, it is not used to limit the present disclosure. It will be apparent to those skilled in the art that various modifications and variations may be made without departing from the scope or spirit of the present disclosure. Thus, the scope of the present disclosure falls within the contemplated scope of the following claims.

What is claimed is:

1. A circuit correction system, comprising:
   a memory configured to store at least one program code; and
   a processor configured to execute the at least one program code to perform operations comprising:
      analyzing a first netlist file and a second netlist file to acquire a change of a circuit structure, wherein the first netlist file corresponds to a first scan chain circuitry, and the second netlist file corresponds to a second scan chain circuitry, wherein the second netlist file is generated by processing the first netlist file with executing an engineering change order (ECO);
      repairing the second scan chain circuitry according to at least one predetermined criterion;
      evaluating a candidate node of the repaired second scan chain circuitry, to connect a new flip flop circuit generated after executing the ECO to the candidate node; and
      storing the second netlist file being processed as a third netlist file, to fabricate an integrated circuit.

2. The circuit correction system of claim 1, wherein the processor is configured to map the first scan chain circuitry and the second scan chain circuitry, and configured to classify the change of the circuit structure.

3. The circuit correction system of claim 2, wherein the processor is configured to sequentially classify an unmapped flip flop circuit in the first scan chain circuitry and the second scan chain circuitry according to a flip-flop type and an input and output pin type, to determine whether the second scan chain circuitry meets the at least one predetermined criterion.

4. The circuit correction system of claim 3, wherein the at least one predetermined criterion includes a disconnection of the flip flop circuit and other circuits of the second scan chain circuitry, a change of an order of connections between the flip flop circuit and other flip flop circuits of the second scan chain circuitry, or any combination thereof.

5. The circuit correction system of claim 3, wherein the processor is configured to reconnect the flip flop circuit to other circuits of the second scan chain circuitry or recover the order of connections between the flip flop circuit and other flip flop circuits of the second scan chain circuitry, to repair the second scan chain circuitry.

6. The circuit correction system of claim 1, wherein the processor is configured to recognize the new flip flop circuit according to the second netlist file, and configured to classify a plurality of existing flip flop circuits and the new flip flop circuit in the second scan chain circuitry according to a clock domain and a triggering edge, to find the at least one candidate node.

7. The circuit correction system of claim 6, wherein the new flip flop circuit is classified into a first classification, and the processor is configured to evaluate at least one existing flip flop circuit of the existing flip flop circuits, which belongs to the first classification, according to at least one of a circuit level, a functional relevance, or a number of fanouts, to find the at least one candidate node.

8. The circuit correction system of claim 7, wherein the processor is configured to rank the at least one existing flip flop circuit according to the circuit level and the functional relevance, and configured to select an output end of a flip flop circuit with a highest ranking and a lowest number of fanouts, in the at least one existing flip flop circuit, as the at least one candidate node.

9. A method for increasing coverage of a scan test, executed by at least one processor, the method comprising:
analyzing a first netlist file and a second netlist file to acquire a change of a circuit structure, wherein the first netlist file corresponds to a first scan chain circuitry, and the second netlist file corresponds to a second scan chain circuitry, wherein the second netlist file is generated by processing the first netlist file with executing an engineering change order (ECO);
repairing the second scan chain circuitry according to at least one predetermined criterion;
evaluating a candidate node of the repaired second scan chain circuitry, to connect a new flip flop circuit generated after executing the ECO to the candidate node; and
storing the second netlist file being processed as a third netlist file, to fabricate an integrated circuit.

10. The method of claim 9, wherein the operation of analyzing the first netlist file and the second netlist file to acquire the change of the circuit structure comprises:
mapping the first scan chain circuitry and the second scan chain circuitry, and classifying the change of the circuit structure.

11. The method of claim 10, wherein the operations of mapping the first scan chain circuitry and the second scan chain circuitry, and classifying the change of the circuit structure comprise:
sequentially classifying an unmapped flip flop circuit in the first scan chain circuitry and the second scan chain circuitry according to a flip-flop type and an input and output pin type, to determine whether the second scan chain circuitry meets the at least one predetermined criterion.

12. The method of claim 11, wherein the at least one predetermined criterion includes a disconnection of the flip flop circuit and other circuits of the second scan chain circuitry, a change of an order of connections between the flip flop circuit and other flip flop circuits of the second scan chain circuitry, or any combination thereof.

13. The method of claim 11, wherein the operation of repairing the second scan chain circuitry according to the at least one predetermined criterion comprises:
reconnecting the flip flop circuit to other circuits of the second scan chain circuitry or recovering the order of connections between the flip flop circuit and other flip flop circuits of the second scan chain circuitry, to repair the second scan chain circuitry.

14. The method of claim 9, wherein the operation of evaluating the candidate node of the repaired second scan chain circuitry, to connect the new flip flop circuit generated after executing the ECO to the candidate node comprises:
recognizing the new flip flop circuit according to the second netlist file; and
classifying a plurality of existing flip flop circuits and the new flip flop circuit in the second scan chain circuitry according to a clock domain and a triggering edge, to find the at least one candidate node.

15. The method of claim 14, wherein the new flip flop circuit is classified into a first classification, and the operation of finding the at least one candidate node comprises:
evaluating at least one existing flip flop circuit of the existing flip flop circuits, which belongs to the first classification, according to at least one of a circuit level, a functional relevance, or a number of fanouts, to find the at least one candidate node.

16. The method of claim 15, wherein the operation of evaluating the at least one existing flip flop circuit of the existing flip flop circuits, which belongs to the first classification, comprises:
ranking the at least one existing flip flop circuit according to the circuit level and the functional relevance; and
selecting an output end of a flip flop circuit with a highest ranking and a lowest number of fanouts, in the at least one existing flip flop circuit, as the at least one candidate node.

* * * * *